Sept. 8, 1959  R. W. TRIPP  2,902,887
BINARY GEAR DEVICE
Original Filed Nov. 15, 1956  2 Sheets-Sheet 1
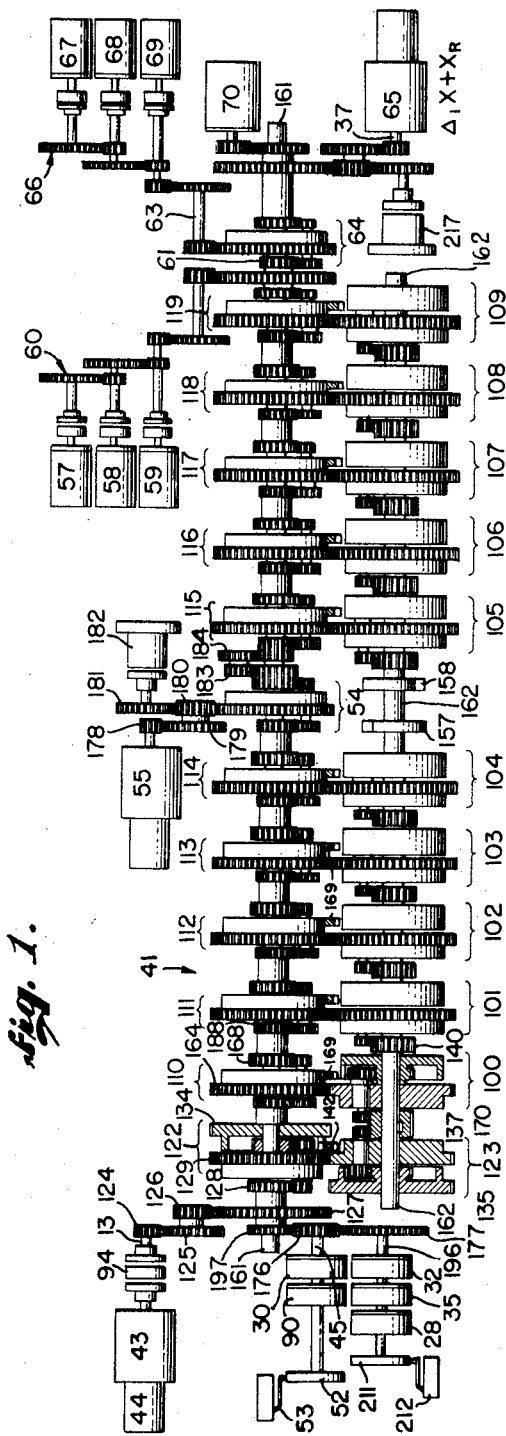
ROBERT W. TRIPP,
INVENTOR.
BY *W E Beatty*
ATTORNEY.

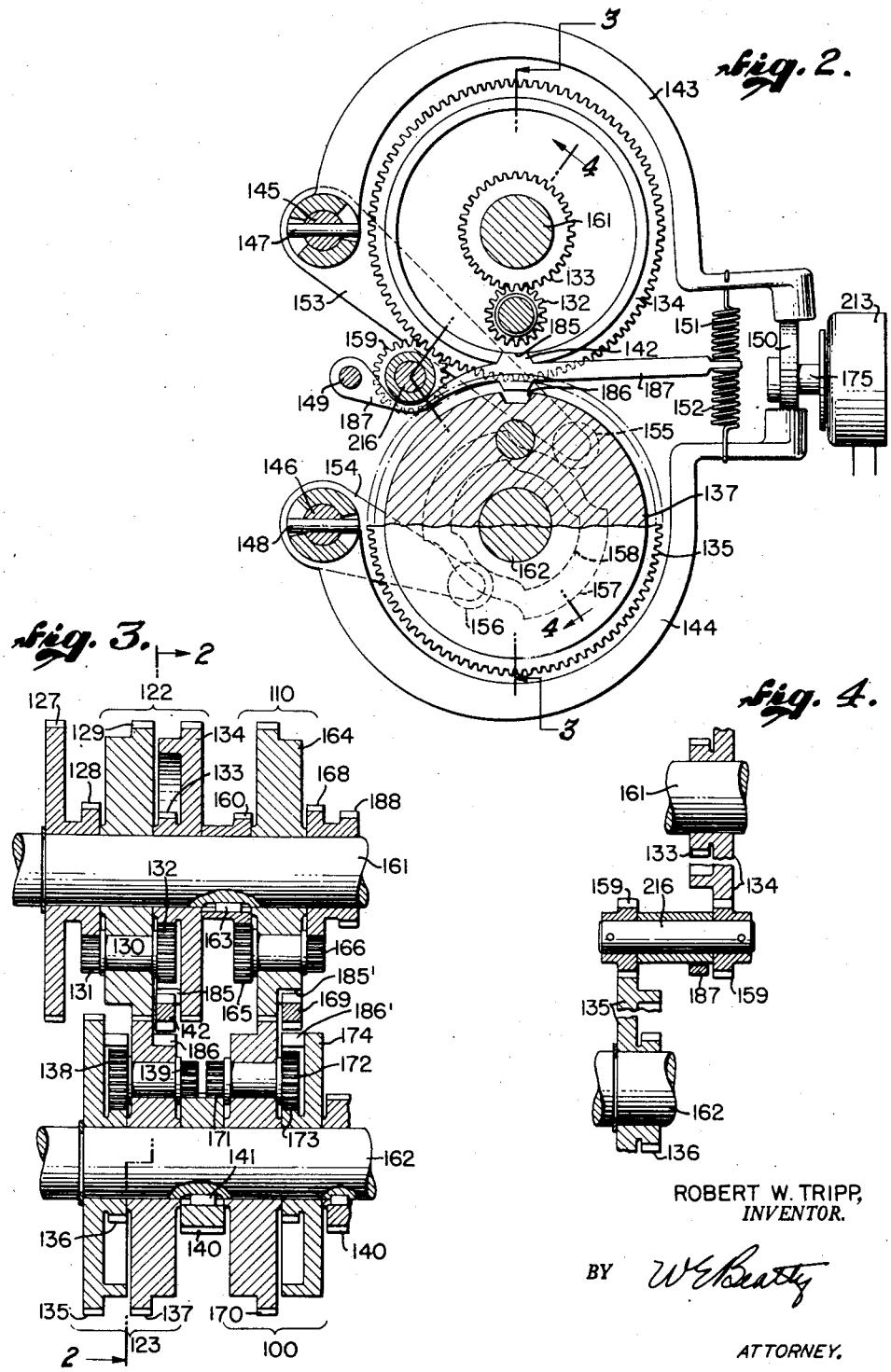

United States Patent Office 2,902,887
Patented Sept. 8, 1959

2,902,887
BINARY GEAR DEVICE

Robert W. Tripp, Bronxville, N.Y., assignor to Inductosyn Corporation, Carson City, Nev., a corporation of Nevada Original application November 15, 1956, Serial No. 622,397. Divided and this application September 11, 1957, Serial No. 683,402

5 Claims. (Cl. 74—750)

The invention relates to a binary gear device useful in a variable speed drive for an automatic machine tool control method and system which will accept input data in digital form and control the motion of a tool relatively to a work piece along a straight path, or along a continuous curve instead of generating a straight line segmental approximations as heretofore proposed, for example in the M.I.T. milling machine control. The tool may be either the cutting tool of a milling machine, lathe, profiler or the like, or it may be the scriber or stylus of a drafting or engraving machine for generating curves.

In U.S. application S.N. 557,035, filed Jan. 3, 1956, for "Automatic Machine Control Method and System," hereafter referred to as Case 3 there is disclosed and claimed an automatic machine tool control method and system which will also accept digital input data for the purpose above mentioned. Case 3 and other patent applications referred to herein are assigned to the assignee of the present application.

The objects of the present invention include the features of an improved binary gear device useful in a variable speed drive for reducing the amount of input data required, eliminating much of the effort required for programming the portion of the computation carried out on a digital computer, and resolving the instruction to the machine elements into a plurality of grades of increments.

Case 3 and several other pending applications referred to later describe and claim the generation of a complex curve by what is essentially extrapolation, in that the various inputs namely, the coordinates of the points and slope, curvature and rate of change of curvature are integrated to direct the path towards the next point on the curve to be generated. This approach involves digital-to-analog conversion of input data into a shaft rotation, resolving the angular position or movement of the shaft into cofunction values having the relation of sine and cosine of the shaft angle and integrating the feed rate of the machine drives along the X and Y axes with such sine and cosine values respectively whereby the machine elements are controlled relatively to each other in a manner defining the straight line or complex curve designated in the input. Depending upon the accuracy of the constants and of the integration, the line or curve thus generated may or may not hit the next point exactly. Thus there is need to provide for checking and correcting as described and claimed in U.S. application S.N. 563,125 filed February 2, 1956, for "Automatic Digital Machine Tool Control," hereinafter referred to as Case 4.

As compared to Cases 3 and 4, an object of the invention is to simplify the apparatus required, avoid inaccuracies due to use of mechanical devices such as ball-disk-cylinder integrators for performing mathematical operations, avoid the necessity for checking the correctness of the tool path, and provide apparatus whereby the correctness of the tool path may be inherently checked, while generating or machining a continuous curve. As described in the related cases, this is accomplished by generating the curve by an interpolation method in which the curve is fitted between point pairs and goes through each point without errors of integration. The accuracy of the approximation to a spline fit depends upon the separation of the points and upon the nature of the curve. The amount of data required can be reduced by selecting the distance between data points with due regard to the required curve shape and the permissible error. The use of the binary gear device of this invention also makes it possible to maintain a constant cutting speed even though each cycle of the feed rate includes point pairs having different separations.

As explained in the related cases, it is possible to obtain the required machine input data with certain relatively simple arithmetical operations. Those cases develop the required mathematical equations. The only original data needed for the evaluation are the X and Y coordinates of a suitable number of points. When the equation of the curve is known, the necessary input data to the machine can be computed.

A particular advantage of the preferred use of the binary gear device of the present invention is that the machine can be stopped at any point of its sequence and be started again without loss of accuracy.

According to this use of the invention, a curve may be divided into segments, and the coordinates of each segment taken as the sum of the coordinates of points along the chord between the point pairs for each segment and the distance from the chord to the curve, measured perpendicular to the chord. The invention is useful for continuously computing this sum in analog form from data of the segment and the chord and data of the required interpolation constants.

A further object of the invention is to provide a binary gear device useful in connection with the steps of continuously computing from such data the lengths of the perpendicular from the chord to the curve, resolving such perpendicular values into their components along the X and Y axes, adding such components to the corresponding components of the chord along such axes, whereby the feed rates of the machine elements along those axes may be controlled accordingly.

While the invention may be used for generating a straight line, or a succession of straight lines having different slopes, the invention is particularly useful for the generation of complex curves by generating successive curved segments. This involves the chord-to-tangent angle and the length of the chord for each segment and for the generation of continuous curves, it also involves preparing the instruction for the next segment while maintaining the instruction for a given segment with a quick shift from one instruction to the next. It is a particular object of the present invention to provide a binary gear device useful for these purposes.

The present application is a division of S.N. 622,397 filed November 15, 1956, by Robert W. Tripp for "Interpolating Method and System for Automatic Machine Tool Control" which discloses and claims the machine tool features of the present case. The variable speed drive disclosed herein is disclosed and claimed in Ser. No. 683,378 filed September 11, 1957, for "Variable Speed Drive Interpolation Method and System for Automatic Machine Control." The computing method and system disclosed herein is disclosed and claimed in Ser. No. 683,403 filed September 11, 1957, for "Interpolation Computing Method and System for Automatic Tool Control." The last two mentioned applications are further divisions of Ser. No. 622,397.

Fig. 1 is a view, partly in section, which may be considered either a plan view or a side view in elevation of the gear mechanism and associated parts.

Fig. 2 is an enlarged sectional view of the gear device of Fig. 1, the section being taken on line 2—2 of Fig. 3, looking in the direction of the arrows, and illustrating the controls for reversing the drive.

Fig. 3 is a section taken on line 3—3 of Fig. 2.

Fig. 4 is a section taken on the broken line 4—4 of Fig. 2 and shows the gear 159 which meshes with the gears 134 and 135.

Fig. 5 is an enlarged sectional view, with parts broken away, illustrating the clutch or detent arm for each of the ten binary gear drives 100 to 109 in Fig. 1.

As described and claimed in the above noted applications particularly S.N. 622,397 and its divisions, the generation of a curve is based on generating chords connecting the successive given points and then computing continuously in analog form the perpendicular distance from the chord to the desired curve using the interpolation constants $\alpha$ and $\beta$. This distance is resolved into its X and Y components by the $\Delta X$, and $\Delta Y$ multipliers 15. To these quantities are then added the components of the offset for the cutter radius. The result is the required path for the cutter center to maintain the face of the cutter substantially tangent to the desired curve.

The chord of the curve is obtained by the use of the two gear ratio units like 41 shown in Figs. 1 to 4 and 5. These units are basically described and claimed in Case 3. An important difference here is the arrangement through the cam 52 to drive the input shaft 45 by one or an integral number of revolutions for each cycle of operation and to permit changes in ratio only at the ends of the cycles. This results in the output gears 61 and shaft 196 for the X axis and the corresponding shafts for the Y axis making a number of revolutions or parts of revolutions proportional to the input number. Thus the angular travel added to the positions of the two output shafts for X and Y is proportional to the distance along the X and Y axes respectively required to generate the chord to the curve. Transfer of the data from storage relays into the gear ratio units 41 and 42 is accomplished accurately at the end of the cycle, without any pause in the motion of the output shafts for X and for Y.

The potentiometer 30 is driven by the input shaft 13 of the gear ratio system through gears 124, 125, 126, 127, 197 and 176 and shaft 45 and is arranged to make one revolution for one cycle of the binary gear ratio equipment 41 for X and the similar one not shown for Y. This potentiometer 30 is used in the analog computing equipment in a manner to be described later.

Similarly, the potentiometers 28, 32 and 35 are driven by the shaft 196 through the gears 197, 176 and 177 so that they make ½ revolution for each cycle of the input to the gear ratio unit 41. These potentiometers 28, 32 and 35 are also used for portions of the computation previously described.

From the outputs of the gear ratio units like 41, the equipment is the same for both the X and Y axes. Therefore, only the equipment for the X axis is completely numbered and it alone is described in detail.

The output gear 61 rotates by the amount equal to that required on the X axis to make the machine move along the chord to the curve.

Since the machine may be required to generate a curve at any point within its capacity, position is added to the information generated by the analog computer equipment. This is accomplished by the differential 54 embodied in the gear mechanism and illustrated in Fig. 1. Differential 54 is driven by the servomotor 55 and gears 178, 179, 180. The resulting position of the output 61 is determined by the resolvers 59, 58, and 57, Fig. 1. These resolvers are geared to each other to correspond to 0.1 inch per revolution, 10 inches per revolution, and 100, 400, or 1000 inches per revolution respectively, by the gears 60. The position is obtained by use of an electronic amplifier system not shown, connecting resolvers 57, 58, 59 and the servomotor 55. This positioning is accomplished before starting the gear ratio equipment like 41, giving the machine the required input information as a starting point. After this is accomplished, the servomotor 55 is turned off and not used again until the next pure positioning operation or set up procedure.

The offset from the chord

The output gear 61 then starts at an angle corresponding to the starting position of the part to be cut, and proceeds in such a way that it corresponds to the required successive X positions for generating the chords of the curve segments to be cut. Similarly, the corresponding shaft for the Y equipment does the same thing for the Y axis. With no further correction, the machine would describe a series of straight lines corresponding to the chords.

As disclosed in application Serial No. 622,397 referred to above, the term H designates the departure of the curve from the chord, measured perpendicularly to the chord from the cutting point on the curve.

The analog equivalent of the X component of H, corresponding to the curve shape as represented by a certain voltage and the X component of the cutter offset as represented by another voltage are added to the output 61 by means of the differential 64 by comparing the output of the analog computation of those voltages with the voltage from the potentiometer 70 and driving the potentiometer 70 by the motor 65 to a null. When this condition has been reached, the shaft of the motor 65 has rotated an angle proportional to the sum of the curve computation and the cutter offset computation. Thus the output shaft 63 from differential 64 now represents the desired position of the center of the cutter along the X axis.

The shaft 63 drives the coarse, medium and fine data elements, or resolvers 67, 68, and 69 through the gears 66. The analog output of these resolvers 67 to 69 determines the position of the machine from moment to moment. However, the zero of the machine coordinate system may be different from that in which the part was dimensioned. Therefore, a zero offset, not shown, may be incorporated to make up the difference between the machine zero and the zero of the coordinate system in which the part was dimensioned.

Gear ratio mechanism, Figs. 1 to 5

Feed rate motor 43, Fig. 1, drives shaft 13 and reduction gears 124, 125, 126. Gear 126 drives in four directions, (a) through gear 127 and gear 128 to operate the gear mechanism 41, (b) through suitable gears not shown to the gear ratios (like 41) for axis Y, (c) through 2 to 1 gear reduction 127, 197, 176, 177, and shaft 196 to cam 211 and potentiometers 28, 32, 35 and (d) gear 176 drives shaft 45 to drive cam 52, wiper of potentiometer 90, and wiper of potentiometer 30, gear 176 being the same size as gear 197 whereby shaft 45 and elements driven by it operate at the same speed as gear ratios like 41, while shaft 196 and the elements driven by it operate at half speed. By means of the differentials 122 and 123, the rotation of gear 128 is transmitted to shaft 162 in either a forward or a reverse direction. The details of this mechanism are more fully explained later. The differentials 110 to 119 inclusively are arranged in series on stationary shaft 161. One input of each differential 110 to 119 is from the corresponding differential 100 to 109 inclusively on shaft 162. The other input is from the output of the preceding differential 110 to 119, or in the case of the first differential 110, zero input is obtained from the gear 160 (Fig. 3) which is keyed by key 163 to the stationary shaft 161. Since the output of any of these differentials is ½ the sum of the inputs, it is apparent that the output of any given differential is divided by a factor of two for each succeeding differential in the gear train. Consequently, the output is proportional to the input, multiplied by the binary number which corresponds to the state of input differentials 100 to 109 inclusively, where a zero represents zero input through the differential and a one represents an input corresponding to shaft 162. A binary gear ratio operating on the same principle is described and claimed in Case 3.

The output of the X position servomotor 55, Fig. 1, is added to the ouput of the gear ratio mechanism by differential 54 which is driven by motor 55 through reduction gears 178, 179 and 180. This differential is located between differentials 114 and 115. This is done to take advantage of the gear reduction in differentials 115 to 119 inclusive as part of the necessary gear reduction between the servomotor 55 and the output. It has the further advantage that any backlash contributed by differential 54 is divided by the above gear reduction. A magnetic brake 182, Fig. 1, is connected to the gear train through gears 180 and 181 and is used to lock motor 55 and the X position input when it has been positioned. The magnetic brake 217, Fig. 1, locks servomotor 65 when its input is zero. Since the output of differential 114 is reduced by a factor of two in passing through differential 54, the output of differential 54 is stepped up to the input of differential 115 by a factor of two through gears 183 and 184, Fig. 1.

*The differential mechanism, Figs. 2 to 5*

Fig. 3 shows the differential mechanism in more detail. Gear 128 drives planetary gears 131 and 132 which are mounted on shaft 130 which is free to rotate in spider gear 129. The spider gear 129 is free to rotate on fixed shaft 161. Gear 132 meshes with gear 133 which is assembled to gear 134. The gear assembly 133—134 is free to rotate on shaft 161. Differential 123 on shaft 162 is identical to differential 122 with output gear 140 corresponding to input gear 128. The spider gears 129 and 137 of the two differentials are engaged with each other. As shown in Fig. 4, a pair of gears 159 joined rigidly to each other, and free to rotate on ther own center are meshed with spider gears 134 and 135 respectively. A detent 142, Figs. 2 and 3, is carried by arm 187 which is pivoted on shaft 149. This detent can engage either notch 185 on spider gear 134 or notch 186 on spider gear 137. If the detent is engaged with the notch in spider gear 137 then both 137 and 129 are locked. In this condition, rotation of gear 128 drives through gears 131, 132, 133, 134, 159, Fig. 4, and 135, 136, 138 and 139, Fig. 3, to drive gear 140 in the same direction and at the same speed as gear 128. If, however, the detent 142 is engaged with notch 185 in gear 134, gear 134 is locked; and through gear 159, gear 135 is also locked. In this case, rotation of gear 128, through the planetary action of gears 131 and 132, drives spider 129, which in turn drives spider 137, and planetary gears 138 and 139, resulting in rotation of gear 140 at the same speed as gear 128 but in the opposite direction. Consequently, the rotation of shaft 162, which is keyed to gear 140 by key 141, is equal to the rotation of input gear 128 and in a direction which depends upon whether detent 142 is engaged with notch 185 or 186, being the same when engaged with 186 and opposite when engaged with 185.

The following description of the operation of the feed differential 100 and binary differential 110 applies to the ten identical sets (100, 110), (101, 111), (102, 112), (103, 113), (104, 114), (105, 115), (106, 116), (107, 117), (108, 118), (109, 119) in the differential mechanism of Fig. 1. As shown in Fig. 3, spiders 164 and 170 are identical to spiders 129 and 137; likewise, planetary gear sets 171, 172 and 165, 166 are identical to previously described assembly 131—132 and 138—139. The assembly of gear 173 and detent shoe 174 is identical to the assembly 133 and 134 except that it does not carry a gear corresponding to the gear 134. A detent 169 is provided which is identical to detent 142 and which may be engaged either with notch 185' in spider 164 or with notch 186' in shoe 174. If engaged with spider 164, which is one of the inputs to differential 110, this input is locked and is equal to zero. Since spider 164, which is locked, is engaged with spider 170, it is also locked. Consequently, rotation of gear 140 through gears 171, 172 and 173 causes shoe 174 to rotate. If, however, detent 169 is engaged with shoe 174 rotation of gear 140 with the planetary action of gears 171 and 172 causes spider 170 to rotate with the planetary action of gears 165 and 166, which in turn drives spider 164 which is the equivalent of an input of one. In the case of the first differential 110 in the train, there is no previous differential, and therefore its input gear 160 is keyed to stationary shaft 161 by key 163 to produce a zero input. The output gear 168 is rigidly fastened to gear 188, the assembly being free to rotate on shaft 161. Gear 188 is the input gear to differential 111 and corresponds to gear 160 in differential 110. The transfer of detent 169 between notches 185', 186' in spider 164 and shoe 174 occurs only at positions corresponding to exactly half revolutions of shaft 162, at which point both notches are aligned exactly with the detent 169. If the detent 169 is in engagement with the shoe 174, ½ revolution of shaft 162 causes spider 164 to rotate one revolution. Likewise, when the detent 169 is engaged with spider 164, ½ revolution of shaft 162 causes one revolution of shoe 174. If the notch 186' in shoe 174 is not in alignment with the detent 169, the cylindrical surface of the shoe 174 forces the detent 169 to remain in engagement with the notch 185' in the spider 164 until the notches again line up after ½ revolution of shaft 162. Likewise, if the detent 169 is engaged with the notch 186' in the shoe 174, rotation of the spider 164 locks the detent until shaft 162 has completed ½ revolution. The position which the detent 169 takes when the two notches are in alignment is determined by the spring load due to springs 151 and 152, Fig. 2.

Detent 142, which determines the direction of rotation, is arranged on arm 187 shown in Fig. 2 which has an offset around the shaft 216 which connects the pair of gears 159, while detent 169 is arranged on a straight arm 201, Fig. 5, there being one arm like 201 for each one of the ten binary sets, 100 to 109. Also, while the variable cam-operated spring-tensioning device shown in Fig. 2 is illustrated as being applied to the arm 187 for detent 142, it is to be understood that a similar spring tension control including a solenoid like 213 is provided for each of the ten arms like 201.

As shown in Fig. 2, arm 143, pivoted on shaft 145 is deflected outwardly by cam 150 thereby applying tension to spring 151. Similarly, arm 144 pivoted on shaft 146 is allowed to move inwardly by cam 150, thus releasing the tension on spring 152. As a result, the detent 169 is forced towards engagement with notch 185'. While cam 150 could be rotated by shaft 175 to directly position arms 143 and 144, considerable force would be required to cause this cam rotation. In order to reduce this force, so that this rotation can be obtained by a light fast-operating solenoid 213, the following additional mechanism is incorporated. Shaft 145 carries an arm 153 which carries a roller 155 which bears against cam 157 attached to shaft 162. As shaft 145 is rotated counterclockwise by the rise in cam 157, pin 147 bears against arm 143 causing it to rotate outwardly to a position somewhat farther than shown and with its outer end clear of cam 150. Similarly, cam 158, roller 156, arm 154, shaft 146 and pin 148 move arm 144 outwardly to a position symmetrical to arm 143. In this position, cam 150 is free of both arms and consequently can be rotated freely. In this position, springs 151 and 152 provide a force tending to center detent 169. At this time, however, the detents 142 and the ten detents like 169 are locked in position by one of the associated cylindrical surfaces and cannot change position. Further rotation of the cams 157 and 158 permits arms 143 and 144 to move inwardly under the influence of springs 151 and 152 until these arms encounter the cam 150. Depending upon the position of cam 150, tension remains in either spring 151 or 152 and positions the detents 142 or 169, etc. accordingly, when their slots come into alignment. The cams are so phased that motion of arms 143 and 144 occurs when their detents 142 or 169, etc. are in the locked position.

I claim:

1. A binary gear device comprising parallel fixed and driven shafts, a plurality of binary gear cells on said fixed shaft, each cell comprising a spur gear differential having an input gear, an output gear and a spider, said gears and said spider being rotatably carried by said fixed shaft, an end one of said cells having an input gear locked to said fixed shaft, said spider having planetary gears connecting its associated input and output gears, the output gear of each cell being fixed to the input gear of the next cell, the output gear of the last cell providing a variable speed output, a reversible drive for said driven shaft and means associated with each of said cells for holding its spider stationary or for connecting the same in driving relation to said driven shaft.

2. A binary gear device according to claim 1, said holding means comprising a circular shoe on said driven shaft for each of said spiders, each spider having a circular surface opposite a circular surface of its shoe, each spider and shoe having a notch in its circular surface, a detent movable from one notch to the other of a spider-shoe pair, each of said surfaces acting to maintain said detent in engagement with the notch in the other surface of the pair until said notches are in alignment, and spring means urging said detent into engagement with one or the other said notches of a pair.

3. A binary gear device according to claim 1, said reversible drive comprising a driving gear rotatably carried by said stationary shaft and a reversible driving connection between said driving gear and said driven shaft.

4. A binary gear device comprising a fixed shaft having a plurality of binary gear cells thereon, each cell comprising an input gear, an output gear and a spider, the input gear of an end cell being fixed to said shaft and the input gear of the other cells and the spiders and output gears of all cells being rotatably carried by said fixed shaft, a parallel driving shaft having a corresponding number of planetary gear driving cells each having an input gear fixed to said driving shaft and a spider and shoe rotatably carried by said driving shaft, each of the spiders of the driving cells having planetary gears coupling the input gear and shoe of its driving cell, the spider of each binary cell having a gear engagement with the spider of the corresponding driving cell and a separate means associated with each binary cell and its driving cell for holding either the spider of the binary cell or the shoe of the corresponding driving cell.

5. A binary gear device comprising a drive shaft, a plurality of binary gear cells each having an input from an output of a preceding cell and each cell having a spider forming another input, each cell having an output equal to one-half the sum of its inputs and the output from the last cell corresponding to the binary bit of the selected cell or cells, each cell having a control device movable to one position to hold its spider fixed and movable to another position to connect the spider to said drive shaft, means associated with each of said control devices for maintaining a selected control device in one of said positions until the end of a cycle of rotation of said drive shaft while urging said control device to its alternate position, said cycle being the same for all of said cells, and means for operating said control devices.

No references cited.